United States Patent [19]
Li et al.

[11] Patent Number: 5,686,986
[45] Date of Patent: Nov. 11, 1997

[54] OPTICAL FIBER CHARACTERISTIC MEASURING DEVICE

[75] Inventors: Zhixien Li; Yasushi Sato; Shoji Adachi, all of Tokyo; Toshio Kurashima, Mito; Kaoru Shimizu, Tokyo, all of Japan

[73] Assignees: Ando Electric Co., Ltd.; Nippon Telegraph and Telephone Corporation, both of Tokyo, Japan

[21] Appl. No.: 721,575

[22] Filed: Sep. 25, 1996

[30] Foreign Application Priority Data

Sep. 26, 1995 [JP] Japan .................................. 7-248169

[51] Int. Cl.⁶ .................................................. G01N 21/88
[52] U.S. Cl. .................................................. 356/73.1
[58] Field of Search .......................................... 356/73.1

[56] References Cited

U.S. PATENT DOCUMENTS 5,375,011  12/1994  Normandin et al. .................. 356/345

FOREIGN PATENT DOCUMENTS

| 2-6725 | 1/1990 | Japan . |
|---|---|---|
| 5-240699 | 9/1993 | Japan . |
| 6-347225 | 12/1994 | Japan . |
| 2 276 508 | 9/1994 | United Kingdom . |
| 2 289 331 | 11/1995 | United Kingdom . |

*Primary Examiner*—Vincent P. McGraw
*Attorney, Agent, or Firm*—Finnegan, Henderson, Farabow, Garrett & Dunner, L.L.P.

[57] ABSTRACT

Coherent light emitted from a coherent light source 1 is sent as a probe beam through a connector 31 into an optical fiber being measured. A portion of this beam is sent to an optical frequency converter 100 to form an optical pulse train having a frequency which is frequency-swept in steps of a designated frequency at a designated periodicity, and an optical pulse having a designated frequency is extracted from the optical pulse train by an electro-optic switch 18 and sent to the optical fiber being measured. Then, a signal beam exiting the optical fiber being measured is heterodyne-received by means of a local beam passing through either a connecting optical fiber 6 side or a frequency shifter 7 side according to the selection of optical switches 4 and 5. Consequently, it is possible to measure the characteristics of the optical fiber by means of a BOTDR, BOTDA or a COTDR.

6 Claims, 3 Drawing Sheets

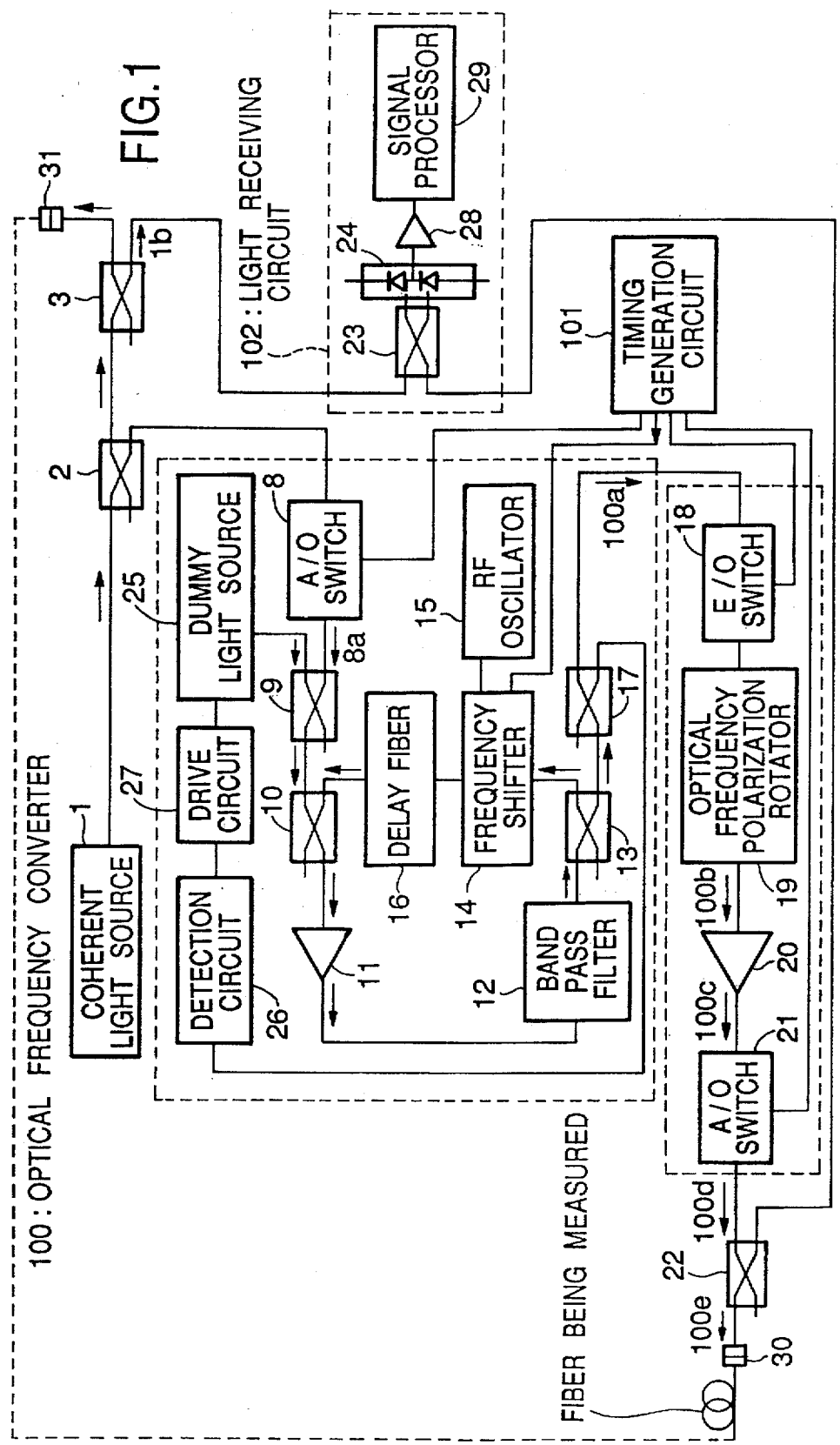

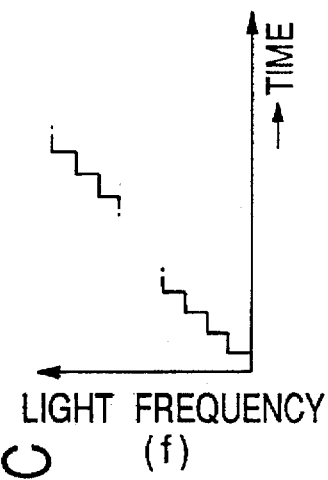
FIG.2C
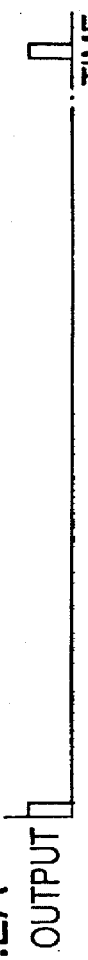
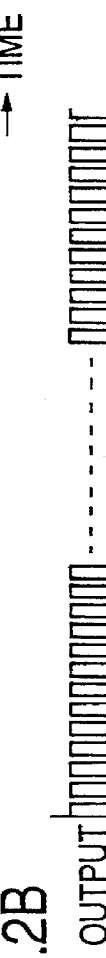
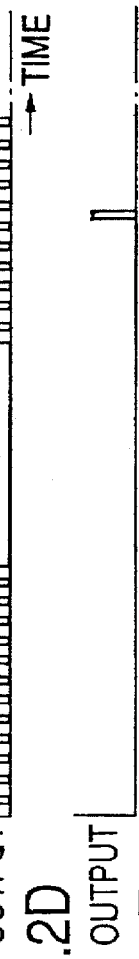
FIG.2A FIG.2B FIG.2D FIG.2E FIG.2F FIG.2G FIG.2H FIG.2I

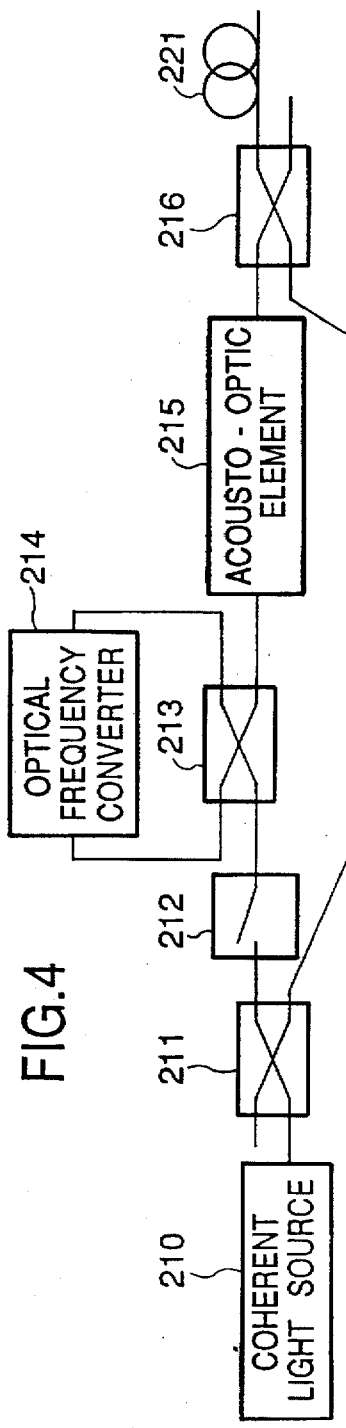
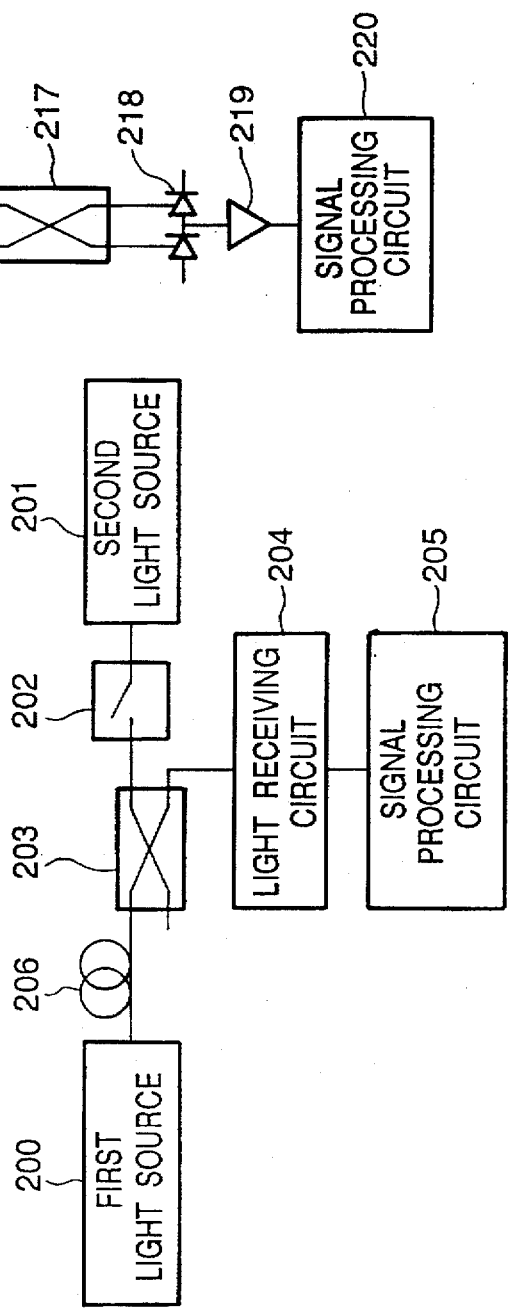
FIG.4 PRIOR ART
FIG.3 PRIOR ART 5,686,986

OPTICAL FIBER CHARACTERISTIC MEASURING DEVICE

BACKGROUND OF THE INVENTION

1. Technical Field of the Invention

The present invention relates to optical fiber characteristic measuring devices which are capable of measuring loss distribution, temperature distribution and distortion distribution in the longitudinal direction of optical fibers by detecting and analyzing Brillouin amplified light, Rayleigh back-scattered light and natural Brillouin scattered light in optical fibers.

2. Background Art

Conventionally, a method is known for measuring characteristics such as loss distribution, temperature distribution and distortion distribution in the longitudinal direction of optical fibers by detecting back-scattered light such as Rayleigh back-scattered light or Brillouin scattered light in optical fibers, and analyzing the detected back-scattered light.

As an example of a device for measuring the characteristics of optical fibers using Brillouin amplified light, there is the BOTDA (Brillouin Optical Time Domain Analyzer). The composition of a BOTDA will be explained with reference to FIG. 3.

In this drawing, reference numeral 200 denotes a first light source which emits a continuous beam having a narrow spectral linewidth to the optical fiber 206 to be measured. Reference numeral 201 denotes a second light source which emits a continuous beam having a narrow spectral linewidth to the optical switch 202. Here, the optical frequency $f_1$ of the continuous beam emitted by the first light source 200 and the optical frequency $f_2$ of the continuous beam emitted by the second light source 201 are set such that $f_2-f_1=f_B$ ($f_B$ is the Brillouin frequency shift particular to the optical fiber 206 being measured). Reference numeral 202 denotes an optical switch which makes the continuous beam emitted by the second light source into pulses. Reference numeral 203 denotes an optical directional coupler which sends the optical pulses emitted by the optical switch 202 to the optical fiber 206 being measured, and sends the continuous beam emitted from the first light source 200 to a light receiving circuit 204 via the optical fiber 206 being measured.

The light receiving circuit 204 converts the optical signals supplied from the optical directional coupler 203 into electrical signals. Reference numeral 205 is a signal processing circuit, which receives electrical signals from the light receiving circuit 204 and processes the temporal waveforms or the amplitude and phase, in order to analyze the characteristics of the optical fiber 206 being measured.

In the above-mentioned BOTDA, the continuous beam emitted from the first light source 200 is Brillouin amplified inside the optical fiber 206 by the optical pulses emitted from the second light source 201 via the optical switch 202. Then, the Brillouin amplified light propagates through the optical directional coupler 203 to the light receiving circuit 204, then is converted into an electrical signal by the light receiving circuit 204 and is supplied to the signal processing circuit 205.

The signal processing circuit 205 analyzes the supplied electrical signal for the temporal changes or amplitude and phase changes in the signal resulting from the Brillouin amplification, to determine the distribution of characteristics along the longitudinal direction of the optical fiber 206 being measured, such as the influence of humidity changes and tension changes applied to the optical fiber and optical loss in the optical fiber 206.

This type of BOTDA has the following properties.

(1) The attenuation of the optical signal passing through the optical directional coupler 203 and incident on the light receiving circuit 204 is small.

(2) The level of the optical signal received at the light receiving circuit 204 can be increased by increasing the optical power of the first light source 200, thereby increasing the measurement precision.

BOTDA's are explained in detail in Japanese Patent Application, First Publication No. 2-6725.

Additionally, as an example of a device for measuring the characteristics of optical fibers from one end using natural Brillouin scattered light, there is the BOTDR (Brillouin Optical Time Domain Reflectometer). The BOTDR will be explained with reference to FIG. 4.

In the drawing, reference numeral 210 denotes a coherent light source, which emits a continuous beam having a narrow spectral linewidth to an optical directional coupler 211. The optical directional coupler 211 divides the continuous beam emitted from the coherent light source 210 into a measurement beam and a reference beam, then sends the measurement beam to an optical switch 212 and the reference beam to an optical directional coupler 217.

The optical switch 212 pulses the continuous beam emitted from the optical directional coupler 211 and sends it to the optical directional coupler 213. The optical directional coupler 213 forms a loop circuit along with an optical frequency converter 214. In this loop circuit, the optical frequency converter 214 shifts the frequency of the optical pulses emitted by the optical switch 212 by a designated frequency, after which ON/OFF control is performed at a designated timing; by repeating this in the above-mentioned loop circuit, the optical frequency is frequency-swept in steps of the designated frequency so as to generate a false continuous beam with a continuously repeating frequency sweep. This continuous beam is sent from the optical directional coupler 213 to the acousto-optic element 215.

The acousto-optic element 215 pulses the measurement beam emitted from the optical directional coupler 213 and sends it to the optical directional coupler 216. The optical directional coupler 216 sends the optical signal emitted from the acousto-optic element 215 to the optical fiber 221 being measured, and sends the natural Brillouin scattered light inside the optical fiber 221 to the optical directional coupler 217.

The optical directional coupler 217 sends a reference beam emitted by the optical directional coupler 211 and Brillouin back-scattered light emitted from the optical directional coupler 216 to an O/E converter 218. The O/E converter 218 coherently receives the natural Brillouin scattered light by means of the reference beam, converts it to an electrical signal, then outputs it to the amplifier 219. The amplifier 219 amplifies the supplied electrical signal and outputs it to the signal processing circuit 220.

The signal processing circuit 220 mean addition processes the supplied electrical signals to measure the characteristics such as loss distribution, temperature distribution and distortion distribution in the longitudinal direction of the optical fiber 221 being measured.

This type of BOTDR has the following properties.

(1) A low-noise coherent detection is possible by making the frequency difference between the natural Brillouin scattered light and the reference beam small.

(2) The measurement time is made faster because the frequency of the measurement beam can be easily swept.

BOTDRs are explained in detail in Japanese Patent Application, First Publication No. 5-240699. Additionally, an example of a device which measures loss characteristics of optical fibers using Rayleigh back-scattered light measured at one end is the COTDR (Coherent Optical Time Domain Reflectometer).

SUMMARY OF THE INVENTION

The object of the present invention is to offer an optical fiber characteristic measuring device which efficiently and economically unites a BOTDA which measures the characteristics of an optical fiber by sending optical signals to both ends of the optical fiber, a BOTDR which measures the characteristics of an optical fiber by sending optical sign&is to one end of the optical fiber, and a COTDR which measures the loss characteristics of an optical fiber by sending optical signals to one end of the optical fiber.

In order to achieve this object, the optical fiber characteristic measuring device according to the present invention comprises a coherent light source for emitting coherent light having a narrow spectral linewidth; splitting means for splitting the coherent light and sending a portion thereof to a first end of the optical fiber; an optical frequency converter for repeatedly changing the optical frequency of the remaining portion of the coherent light in steps of a designated frequency at a designated periodicity; extraction means for extracting an optical signal of a desired frequency from among optical signals outputted by the optical frequency converter and sending the extracted optical signal to a second end of the optical fiber; and light receiving means for coherently receiving a coherent beam emitted by the coherent light source and an optical signal emitted from the second end of the optical fiber, then processing the received signal to measure characteristics of the optical fiber.

By using this type of structure, an optical pulse signal of a desired frequency extracted by the extraction means is sent to the second end surface of the optical fiber, while the light receiving circuit heterodyne-receives the signal beam exiting the second end surface of the optical fiber by means of a local beam when the coherent light from the coherent light source is sent to the light receiving circuit as the local beam, so as to allow detection of natural Brillouin scattered light.

Additionally, when a portion of the coherent light emitted from the coherent light source is further sent to the first end surface of the optical fiber, the light receiving circuit heterodyne-receives the signal beam exiting the second end surface of the optical fiber by means of the above-mentioned local beam, so as to allow detection of a Brillouin amplified probe beam.

Consequently, by suitably selecting the frequency of the optical pulse signal extracted by the extraction means and applying the necessary procedures to the detected natural Brillouin scattered light, Brillouin amplified probe light or Rayleigh back-scattered light, it is possible to perform the same measurements as with a BOTDR, a BOTDA and a COTDR using a single device.

BRIEF DESCRIPTION OF THE DRAWINGS

FIG. 1 is a block diagram showing the structure of an optical fiber characteristic measuring device according to an embodiment of the present invention.

FIGS. 2A–2I are waveform diagrams showing optical signal waveforms at each section in the above-mentioned optical fiber characteristic measuring device.

FIG. 3 is a block diagram showing the Structure of a conventional BOTDA.

FIG. 4 is a block diagram showing the structure of a conventional BOTDR.

PREFERRED EMBODIMENTS OF THE INVENTION

Hereinbelow, an embodiment of the present invention will be explained with reference to the drawings.

FIG. 1 is a block diagram showing the structure of an optical fiber characteristic measuring device according to an embodiment of the present invention.

In this drawing, reference numeral 1 denotes a coherent light source for emitting a coherent beam having a narrow spectral linewidth; for example, a 1.55 µm band MQW/DFB (Multi Quantum Well/Distributed Feedback) semiconductor laser having ATC (automatic temperature control) can be used. Reference numerals 2, 3, 9, 10, 13, 17, 22 and 23 denote optical directional couplers.

Here, optical directional couplers 2, 3, 13 and 17 are 1×2 optical directional couplers each having a single input port and two output ports, so that optical signals entering the input port are divided and emitted from the two output ports. Additionally, optical directional couplers 9 and 10 are 2×1 optical directional couplers each having two input ports and a single output port, so that optical signals entering the respective input ports are combined and emitted from the output port. Additionally, optical directional coupler 22 has three ports; the optical signals entering the first port are emitted from the second port, while the optical signals entering the second port are emitted from the third port. Furthermore, the optical directional coupler 23 has two input ports and two output ports; the optical signals entering the two input ports are emitted from respectively corresponding output ports.

Reference numerals 8 and 21 denote acousto-optic switches which turn the incident light ON/OFF according to timing signals from the timing generation circuit 101. Reference numerals 11 and 20 denote optical amplifiers which amplify incident light. Reference numeral 12 denotes a bandpass filter having a 5 nm optical passage bandwidth. Reference numeral 14 is an optical frequency shifter which shifts the frequency of incident optical signals by the frequency of a sine wave signal (250–500 mV) supplied from the RF oscillator 15. Additionally, the timing for shifting the frequency is dependent upon the timing signal supplied from the timing generation circuit 101. In the present embodiment, the sine wave signal outputted by the RF oscillator 15 has a frequency of 120 MHz–122 MHz. Therefore, the frequency shifter 14 shifts the frequency by 120 MHz–122 MHz.

Reference numeral 16 is a delay fiber which delays the incident optical signals by a designated time period. Reference numeral 18 denotes an electro-optic switch which turns an incident optical signal ON/OFF according to a timing signal supplied from the timing generation circuit 101. Reference numeral 19 denotes an optical frequency polarization rotator which turns an incident optical pulse signal into optical pulses having alternately orthogonal planes of polarization. Reference numeral 24 denotes an photoelectric converter which converts supplied optical signals into electrical signals.

Reference numeral 25 denotes a dummy light source which emits light having a wavelength of 1.535 µm according to a drive signal from the drive circuit 27. Reference numeral 26 is a detection circuit which detects an optical signal wherein the phase of the incident optical signal has been inverted. Reference numeral 27 denotes a drive circuit which outputs a drive signal due to an optical signal detected by the detection circuit 26, in order to drive the dummy light source 25. Reference numeral 28 denotes an amplifier which amplifies an inputted electrical signal.

Reference numeral 29 denotes a signal processor which applies a designated process to a supplied electrical signal to measure the characteristics of an optical fiber being measured. Reference numerals 30 and 31 are connectors which are respectively connected to either end of the optical fiber being measured. Reference numeral 101 denotes a timing generation circuit generates and outputs the required timing signals to the above-mentioned frequency shifter 14, acousto-optic switches 8 and 21, and electro-optic switch 18.

Next, the operation of the above-described optical fiber characteristic measuring device will be explained with reference to FIGS. 1 and 2.

First, coherent light emitted from the coherent light source 1 is split by the optical directional coupler 2, to be sent to the optical directional coupler 3 and the optical frequency converter 100.

The coherent light from the coherent light source 1 which is sent to the optical directional coupler 3 is sent to the optical directional coupler 23 of the light receiving circuit 10, and a portion is split off and sent to the connector 31 for use as a probe beam when the optical fiber measuring device is used as a BOTDA. This probe beam receives a Brillouin amplification effect when passing through the optical fiber being measured, then passes through the connector 30 so as to be incident at the second port of the optical directional coupler 22.

On the other hand, the coherent light which is split by the optical directional coupler 2 and sent to the frequency converter 100 is first incident on the acousto-optica switch 8 inside the optical frequency converter 100, and is modulated into pulses as shown in FIG. 2A. In this case, the pulse width and pulse period of the optical pulse signal pulsed by the acousto-optic switch 8 are respectively determined by the delay time due to the delay fiber 16 and the distance range of the delay fiber 16. Normally, the pulse width should be 4–10 µs and the pulse period should, for example, be 800 µs for a distance range of 40 km.

After the optical pulse signal pulsed by the acousto-optic switch 8 is combined with the optical signal emitted from the dummy light source 25 at the optical direction coupler 9, it enters through the optical directional coupler 10 into the loop circuit formed by the optical amplifier 11, the bandpass filter 12, the optical directional coupler 13, the frequency shifter 14, the delay fiber 16 and the optical directional coupler 10. The optical pulse signal entering this loop circuit is first amplified by the optical amplifier 11, then passes through the bandpass filter 12, after which it is incident on the optical directional coupler 13. At this time, a portion of the optical pulse signal incident on the optical directional coupler 13 exits the loop circuit while the rest of the optical pulse signal is sent to the frequency shifter 14. Then, a portion of the optical pulse signal exiting the loop circuit from the optical directional coupler 13 is split off by the optical directional coupler 17 is sent to the detection circuit 26.

On the other hand, the optical pulse signal sent to the frequency shifter 14 is frequency-shifted by the frequency of a sine wave signal supplied from the RF oscillator 15 according to a timing signal supplied from the timing generation circuit 101. Additionally, the optical pulse signal shifted by the frequency shifter 14 is sent to the optical directional coupler 10 after being delayed by the pulse width of the optical pulse signal emitted by the acousto-optic switch 8 by means of the delay fiber 16.

This delayed optical pulse signal passes through the optical amplifier 11 and the bandpass filter 12, after which a portion is emitted from the optical directional coupler 13. At this time, the optical frequency of the emitted optical pulse signal is higher than the optical frequency of the previously emitted optical pulse signal by the frequency of the shift. Thereafter, the same operation is repeated until the next optical signal is inputted from the acousto-optic switch 8. As a result, an optical pulse train 10a as shown in FIG. 2B is emitted from the optical frequency converter 100. Additionally, the frequency within each optical pulse in this optical pulse train 100a becomes sequentially higher in steps of the frequency of shift by the frequency shifter 14 as shown in FIG. 2C.

Additionally, when optical pulses are not being emitted for the optical pulse train 100a, a detection signal from the detection circuit 26 detecting the inverted phase of the optical pulse train 100a causes the drive circuit 27 to activate the dummy light source 25, so that light having a wavelength of 1.535 µm is sent through the optical directional couplers 9 and 10 to be incident on the optical amplifier 11. Therefore, an optical signal is always incident on the optical amplifier 11, so as to prevent sudden surges of the optical intensity in the pulse signal forward end portion which are likely to occur when the optical pulse signal is amplified. Additionally, the light from the dummy light source 25 which is emitted from the optical amplifier 11 is eliminated by the bandpass filter 12 so as not to be sent to the optical frequency converter 100.

The electro-optic switch 18 extracts an optical pulse having a desired optical frequency from among the optical pulse train 100a emitted from the optical frequency converter 100 and sends the optical pulse to the optical frequency polarization rotator 19, according to a timing signal supplied from the timing generation circuit 101. The optical frequency polarization rotator 19 is controlled such that the plane of polarization is made alternately orthogonal with the incidence of each extracted optical pulse. As a consequence, polarization dependency fluctuations of the optical pulse extracted by the electro-optic switch 18 and polarization dependency of Brillouin scattered light can be eliminated.

The optical pulse 100b (see FIG. 2E) emitted by the optical frequency polarization rotator 19 is amplified by the optical amplifier 20. At this time, the optical pulse 100c emitted from the optical amplifier 20 is released from the optical amplifier 20 along with spontaneous emission light as shown in FIG. 2F. In order to eliminate this, the timing generation circuit 101 supplies a timing signal as shown in FIG. 2G to the acousto-optic switch 21, in order to control the acousto-optic switch 21 to be OFF when the optical pulse has a frequency other than the desired frequency. The optical pulse 100e (see FIG. 2H) obtained in this manner enters the optical directional coupler 22 through the first port and exits through the second port to be sent to the connector 30.

Then, natural Brillouin scattered light generated when the optical pulse 100e sent to the connector 30 passes through the optical fiber being measured enters the optical directional coupler 22 through the second port and exits through the third port. Additionally, a probe beam which has received a Brillouin amplification effect when passing through the optical fiber being measured entered from the connector 31 similarly enters through the second port and exits through the third port.

These optical signals emitted from the third port are made incident on the optical directional coupler 23 of the light receiving circuit 102 as signal beams.

The optical directional coupler 23 respectively sends a local beam emitted from the optical directional coupler 3 and the signal beam emitted from the third port of the optical directional coupler 22 to a photoelectric converter 24. Additionally, the photoelectric converter 24 heterodyne-receives the respectively incident local beam and signal beam, so as to convert them into an electrical signal which is outputted to the electrical amplifier 28.

AT this time, the optical frequency of the local beam is equal to the optical frequency of the coherent light emitted by the coherent light source. Then, after the signal beam has been heterodyne-received at the photoelectric converter by means of the local beam and converted into an electrical signal, an electrical homodyne detection is performed at the electrical amplifier 28. As a result, the Brillouin back-scattered light in the optical fiber being measured or the Brillouin amplified light in the optical fiber being-measured can be detected.

On the other hand, when an optical pulse having a frequency 120 MHz different from the frequency of the local beam is extracted from the optical pulse train 100a by the electro-optic switch 18 and the optical pulse 100f (see FIG. 2I) which has passed through the optical frequency polarization rotator 19, the optical amplifier 20 and the acousto-optic switch 21 is incident on the first port of the optical directional coupler 22, Rayleigh back-scattered light, generated when the optical pulse 100f sent to the connector 30 from the second port of the optical directional coupler 22 passes through the optical fiber being measured, is incident on the second port of the optical directional coupler 22, and is emitted from the third port as a signal beam. Then, the above-mentioned signal beam is heterodyne-received at the photoelectric converter 24 by means of a local beam to be converted into an electrical signal, after which an electrical heterodyne detection is performed at the electrical amplifier 28. As a result Rayleigh back-scatter light can be detected. Then, the signal processor 29 performs signal processing of the electrical signal outputted from the electrical amplifier 28. Consequently, when an optical pulse 100e is sent from the second port of the optical direction coupler 22 to the connector 30, it is possible to make the same measurements as the optical fiber characteristic measurements made by a BOTDR. Additionally, when a probe beam is made incident from the connector 31 side on the optical fiber being measured, it is possible to make the same measurements as the optical fiber characteristic measurements made by a BOTDA.

Furthermore, when an optical pulse 100f is sent from the second port of the optical directional coupler 22 to the connector 30, it is possible to make the same measurements as the optical fiber measurements made by a COTDR.

We claim:

1. An optical fiber characteristic measuring device for measuring characteristics of an optical fiber, comprising:

a coherent light source for emitting coherent light having a narrow spectral linewidth;

splitting means for splitting said coherent light and sending a portion thereof to a first end of said optical fiber;

an optical frequency converter for repeatedly changing the optical frequency of the remaining portion of said coherent light in steps of a designated frequency at a designated periodicity;

extraction means for extracting an optical signal of a desired frequency from among optical signals outputted by said optical frequency converter and sending the extracted optical signal to a second end of said optical fiber; and light receiving means for coherently receiving a coherent beam emitted by said coherent light source and an optical signal emitted from said second end of said optical fiber, then processing the received signal to measure characteristics of said optical fiber.

2. An optical fiber characteristic measuring device for measuring characteristics of an optical fiber, comprising:

a coherent light source for emitting coherent light having a narrow spectral linewidth;

a first optical directional coupler for sending said coherent light to a main route while splitting off a portion to send to a subsidiary route;

a second optical directional coupler for sending coherent light exiting said subsidiary route of said first optical directional coupler to said main route while splitting off a portion to send from said subsidiary route to a first end surface of an optical fiber;

an optical frequency converter for repeatedly changing the optical frequency of the coherent light exiting said main route of said first optical directional coupler in steps of a designated frequency at a designated periodicity;

pulsing means for pulsing an optical signal having a desired wavelength among optical signals outputted by said optical frequency converter and outputting the pulsed optical signal;

a third optical directional coupler for sending said pulsed optical signal outputted by said pulsing means from said main route to a second end surface of said optical fiber, while sending an signal light exiting said second end surface, or back-scattered signal light, to said subsidiary route; and a light receiving circuit for coherently receiving signal light exiting said subsidiary route of said third optical directional coupler and coherent light exiting said main route of said second optical directional coupler, then processing the received signals to measure characteristics of said optical fiber.

3. An optical fiber characteristic measuring device according to claim 2, wherein said optical frequency converter comprises:

an acousto-optic switch for pulsing coherent light exiting said main route of said first optical directional coupler at a designated periodicity; and a loop circuit wherein said pulsed optical signal outputted from said acousto-optic switch is amplified, after which a portion is split off to send to said pulsing means, while the remaining portion is frequency-shifted by a designated frequency and delayed by a designated time period, whereafter said pulsed optical signal is repeatedly amplified, split, frequency-shifted and delayed.

4. An optical fiber characteristic measuring device according to claim 3, further comprising:

a light source for emitting an optical signal having a wavelength different from the wavelength of said coherent light emitted by said coherent light source;

detection means for detecting the inverted phase of an optical signal exiting said loop circuit;

a drive circuit for driving said light source based on the phase detected by said detection means; and input means for inputting an optical signal emitted by said light source into said loop circuit.

5. An optical fiber characteristic measuring device according to claim 3, wherein said loop circuit comprises:

an optical amplifier for amplifying said pulsed optical signal outputted by said acousto-optic switch;

a bandpass filter for passing only a designated frequency bandwidth among pulsed optical signals outputted by said amplifier;

splitting means for splitting off a portion of a pulsed optical signal outputted by said bandpass filter to send to said pulsing means;

an optical frequency shifter for frequency-shifting by a designated frequency the remaining portion of the pulsed optical signal outputted by said splitting means; and a delay fiber for delaying a pulsed optical signal outputted by said optical frequency shifter by the pulse width of said pulsed optical signal, and sending the delayed pulsed optical signal to said input means.

6. An optical fiber characteristic measuring means according to claim 3, wherein said pulsing means comprises:

an electro-optic switch for pulsing said optical signal outputted by said optical frequency converter;

a polarization control device for making the pulsed optical signal outputted by said electro-optic switch into optical pulses having alternately perpendicular planes of polarization;

an optical amplifier for amplifying a pulsed optical signal outputted by said polarization control device; and an acousto-optic switch for eliminating spontaneous emission light emitted by said optical amplifier and passing only the pulsed optical signals.

* * * * *